United States Patent
Kadono et al.

(10) Patent No.: US 9,470,314 B2
(45) Date of Patent: Oct. 18, 2016

(54) RUBBER GASKET FOR FUEL CELL

(71) Applicants: SUMITOMO RIKO COMPANY LIMITED, Aichi-ken (JP); TOYOTA JIDOSHA KABUSHIKI KAISHA, Aichi-ken (JP)

(72) Inventors: Hideya Kadono, Aichi-ken (JP); Hiroki Itakura, Aichi-ken (JP); Kenji Sato, Aichi-ken (JP); Takuya Kurihara, Aichi-ken (JP); Hideaki Tanahashi, Aichi-ken (JP)

(73) Assignees: SUMITOMO RIKO COMPANY LIMITED, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/679,378

(22) Filed: Apr. 6, 2015

(65) Prior Publication Data

US 2015/0380694 A1 Dec. 31, 2015

(30) Foreign Application Priority Data

Jun. 26, 2014 (JP) .................................. 2014-130976

(51) Int. Cl.
 *F16J 15/10* (2006.01)
 *F16J 15/06* (2006.01)
 *F16J 15/02* (2006.01)
 (Continued)

(52) U.S. Cl.
 CPC ............. *F16J 15/104* (2013.01); *F16J 15/024* (2013.01); *F16J 15/062* (2013.01); *H01M 8/0276* (2013.01); *H01M 2008/1095* (2013.01)

(58) Field of Classification Search
 CPC ........ F16J 15/021; F16J 15/022; F16J 15/06; H01M 2/08
 See application file for complete search history.

(56) References Cited

U.S. PATENT DOCUMENTS 3,575,431 A * 4/1971 Bryant .................. F16K 3/0227
 251/315.01
5,735,529 A * 4/1998 Lawrence .............. F16J 15/123
 277/596

(Continued)

FOREIGN PATENT DOCUMENTS

DE WO 2004031625 A1 * 4/2004 ............. F16J 15/022
JP 10-501873 2/1998

(Continued)

OTHER PUBLICATIONS

Japan Official Action and English language translation thereof, dated Apr. 26, 2016.

*Primary Examiner* — Kristina Fulton
*Assistant Examiner* — L. Susmitha Koneru
(74) *Attorney, Agent, or Firm* — Greenblum & Bernstein, P.L.C.

(57) ABSTRACT

A rubber gasket for a fuel cell is interposed between a first member and a second member stacked in the fuel cell. The fuel cell includes: a seat portion arranged on a surface of the first member; and a lip portion that includes a first hill portion projecting from the seat portion toward the second member and having a curved surface with a first curvature radius and a second hill portion projecting from the first hill portion toward the second member and having a curved surface with a second curvature radius smaller than the first curvature radius, and that makes elastic contact with the second member. The seat portion includes a planar inclined surface inclined with respect to the surface direction at a connecting portion leading to a bottom of the first hill portion.

13 Claims, 8 Drawing Sheets

(51) Int. Cl.
H01M 8/02 (2016.01)
H01M 8/10 (2016.01)

(56) References Cited

U.S. PATENT DOCUMENTS 8,246,055 B2 * 8/2012 Asplund ................ F16L 23/22
277/609
2011/0318665 A1 * 12/2011 Yamamoto .......... H01M 8/0273
429/469
2013/0106064 A1 * 5/2013 Okuda ................... F16J 15/122
277/591

FOREIGN PATENT DOCUMENTS

| JP | 2003-120819 | 4/2003 |
| JP | 2005-50728 | 2/2005 |
| JP | 4530122 | 8/2010 |
| JP | 2012-195128 | 10/2012 |

* cited by examiner

RUBBER GASKET FOR FUEL CELL

INCORPORATION BY REFERENCE

The disclosure of Japanese Patent Application No. 2014-130976 filed on Jun. 26, 2014 including the specification, drawings and abstract is incorporated herein by reference in its entirety.

BACKGROUND OF THE INVENTION

1. Field of the Invention

The present invention relates to a rubber gasket for a fuel cell for sealing configuring members of the fuel cell.

2. Description of the Related Art

In a fuel cell, a cell in which an electrode member including a membrane electrode assembly (MEA) is sandwiched between separators serves as a unit for power generation. The fuel cell is configured by stacking a number of cells. A frame-shaped rubber gasket is arranged at the periphery of the electrode member and between the adjacent separators to ensure sealability and insulating property with respect to gas and cooling medium. For example, Japanese Patent Application Publication Nos. 2005-50728 (JP 2005-50728 A) and 2012-195128 (JP 2012-195128 A) and Japanese Patent Publication No. 4530122 (JP 4530122 B) describe a rubber gasket including a seat portion and a lip portion.

FIG. 13 shows a cross-sectional view of the rubber gasket in a height direction described in JP 2005-50728 A as an example of a conventional rubber gasket. As shown in FIG. 13, a rubber gasket 9 is arranged on a surface of a separator 94. The rubber gasket 9 includes a seat portion 90 and a lip portion 93. The lip portion 93 is a two-stage rounded portion including a first hill portion 91 and a second hill portion 92. A curvature radius R2 of the second hill portion 92 is smaller than a curvature radius R1 of the first hill portion 91. Assuming a perpendicular line drawn from a center C2 of curvature of the second hill portion 92 to the separator 94 is a central axis A of the second hill portion 92, a center C1 of curvature of the first hill portion 91 also lies on the same central axis A. In other words, the center C1 of curvature of the first hill portion 91 and the center C2 of curvature of the second hill portion 92 are on the same central axis A. The seat portion 90 includes a horizontal surface 900 leading in a horizontal direction from a bottom of the first hill portion 91.

When a fuel cell is in an assembled state, the rubber gasket is compressed in the height direction by the adjacent separator. In this case, the rubber gasket is required to have a wide range of usable compression rates. In other words, at the time of high compression in which a pressing force from the separator is large and the compression rate of the rubber gasket is high, it is demanded that the lip portion that makes elastic contact with the separator does not break easily. At the time of low compression in which the pressing force from the separator is small and the compression rate of the rubber gasket is low, on the other hand, it is demanded that the lip portion is compressed in the height direction without being bent and without collapsing, and that the sealability is ensured by the reaction force of the rubber gasket.

However, in the conventional rubber gasket having the shape shown in FIG. 13, strain tends to concentrate at the interior of a connecting portion between the first hill portion and the seat portion, thus causing the lip portion to easily break at the time of high compression. At the time of low compression, on the other hand, the lip portion is not compressed in the height direction (central axis A direction in FIG. 13) so it tends to fold and collapse, and the sealability is difficult to ensure. Thus, the range of compression rates at which the rubber gasket can be used is limited.

SUMMARY OF THE INVENTION

In light of such situations, the present invention aims to provide a rubber gasket for a fuel cell having satisfactory sealability even at the time of low compression, and having a wide range of usable compression rates.

(1) A first aspect of the present invention relates to a rubber gasket for a fuel cell, which is interposed between two members stacked in the fuel cell. In the rubber gasket, a direction in which the two members are stacked is a stacking direction, a direction orthogonal to the stacking direction is a surface direction, one of the two members is a first member, and the other member is a second member. The rubber gasket for a fuel cell includes: a seat portion arranged on a surface of the first member; and a lip portion. The lip portion includes: a first hill portion projecting from the seat portion toward the second member and having a curved surface with a first curvature radius; and a second hill portion projecting from the first hill portion toward the second member and having a curved surface with a second curvature radius smaller than the first curvature radius, and makes elastic contact with the second member. The seat portion has a planar inclined surface inclined with respect to the surface direction at a connecting portion leading to a bottom of the first hill portion, and a center of curvature of the first hill portion does not lie on a central axis of the second hill portion, the central axis being a perpendicular line drawn from a center of curvature of the second hill portion to the first member.

The seat portion in the rubber gasket for a fuel cell according to the present invention is coupled to the bottom of the first hill portion by the planar inclined surface. In other words, the seat portion in the present invention does not include a horizontal surface extending in the horizontal direction from the bottom of the first hill portion. The seat portion in the present invention differs from the seat portion of the rubber gasket shown in FIG. 13 in this regard. The connecting portion between the first hill portion and the seat portion can be formed thick by setting the connecting portion leading to the bottom of the first hill portion as a planar inclined surface. The lip portion thus does not easily collapse, and the sealability can be easily ensured even at the time of low compression. Furthermore, the breakage of the lip portion at the time of high compression can be suppressed as the connecting portion between the first hill portion and the seat portion is reinforced.

In the rubber gasket for a fuel cell according to the present invention, the center of curvature of the first hill portion does not lie on the central axis of the second hill portion, the central axis of the second hill portion being assumed as a perpendicular line drawn from the center of curvature of the second hill portion to the first member. The lip portion in the present invention differs from the lip portion of the rubber gasket shown in FIG. 13 in this regard. The connecting portion between the first hill portion and the second hill portion can be formed thick by shifting the center of curvature of the first hill portion from the central axis of the second hill portion. The lip portion thus does not easily collapse, and the sealability can be easily ensured even at the time of low compression.

Therefore, according to the rubber gasket for a fuel cell of the present invention, the sealability at the time of low compression is ensured and the range of usable compression rates can be expanded toward the low compression rate side. For example, according to the rubber gasket for the fuel cell of the present invention, the sealability can be ensured even at the time of low compression, or when the compression rate is 10%, as shown in the examples to be described later. Furthermore, the range of usable compression rates (maximum compression rate at which the rubber gasket does not break—minimum compression rate at which the sealability is ensured) can be made higher than or equal to 50%.

(2) In the configuration of (1) described above, an angle formed by the inclined surface of the seat portion and the surface of the first member is preferably larger than or equal to 15° and smaller than or equal to 35°.

The angle formed by the inclined surface of the seat portion and the surface of the first member may be measured by extending the inclined surface of the seat portion until it contacts the surface of the first member. Alternatively, a virtual surface may be assumed by extending the surface of the first member in the surface direction, and the angle may be measured by extending the inclined surface of the seat portion until it contacts the virtual surface.

If the angle of the inclined surface with respect to the surface of the first member is too small, the connecting portion between the first hill portion and the seat portion cannot be formed sufficiently thick. The lip portion thus may collapse easily and the sealability may be difficult to ensure at the time of low compression. If the angle of the inclined surface is too large, the connecting portion between the first hill portion and the seat portion becomes too thick. The strain thus may concentrate at the lower side portion of the seat portion at the time of high compression, which may lead to breakage of the rubber gasket. According to the present configuration, the connecting portion between the first hill portion and the seal portion can be appropriately made thick, so that both the sealability at the time of low compression and the suppression of breakage of the rubber gasket at the time of high compression can be achieved.

(3) In the configuration of (1) and (2) described above, a ratio of the first curvature radius of the first hill portion with respect to a length of the rubber gasket in the stacking direction is preferably larger than or equal to 0.64 and smaller than or equal to 0.91.

If the ratio of the first curvature radius of the first hill portion with respect to the length of the rubber gasket in the stacking direction (height of rubber gasket) is too small, the connecting portion between the first hill portion and the seat portion cannot be made sufficiently thick. The lip portion thus may collapse easily and the sealability may be difficult to ensure at the time of low compression. If the ratio is too large, the strain may concentrate at the interior of the first hill portion at the time of high compression, which may lead to breakage of the rubber gasket. According to the present configuration, the value of the ratio is optimized, so that both the sealability at the time of low compression and the suppression of breakage of the rubber gasket at the time of high compression can be achieved.

(4) In the configuration of any one of (1) to (3) described above, the two members are preferably separators.

According to the present configuration, the periphery of the electrode member sandwiched by the separators in the fuel cell and the space between the adjacent separators can be sealed in a wide range from the low compression rate to the high compression rate.

DETAILED DESCRIPTION OF THE EMBODIMENTS

An embodiment of a rubber gasket for a fuel cell according to the present invention will be hereinafter described. In the embodiment, the rubber gasket for the fuel cell according to the present invention is embodied as a first rubber gasket.

<Configuration of Fuel Cell>

First, a configuration of a fuel cell including a rubber gasket for a fuel cell (hereinafter appropriately abbreviated as "rubber gasket") according to the present embodiment will be described. In the embodiment described below, an up-down direction corresponds to a "stacking direction" of the present invention, and a horizontal direction (front-back, left-right directions) corresponds to a "surface direction" of the present invention.

Figure 1:
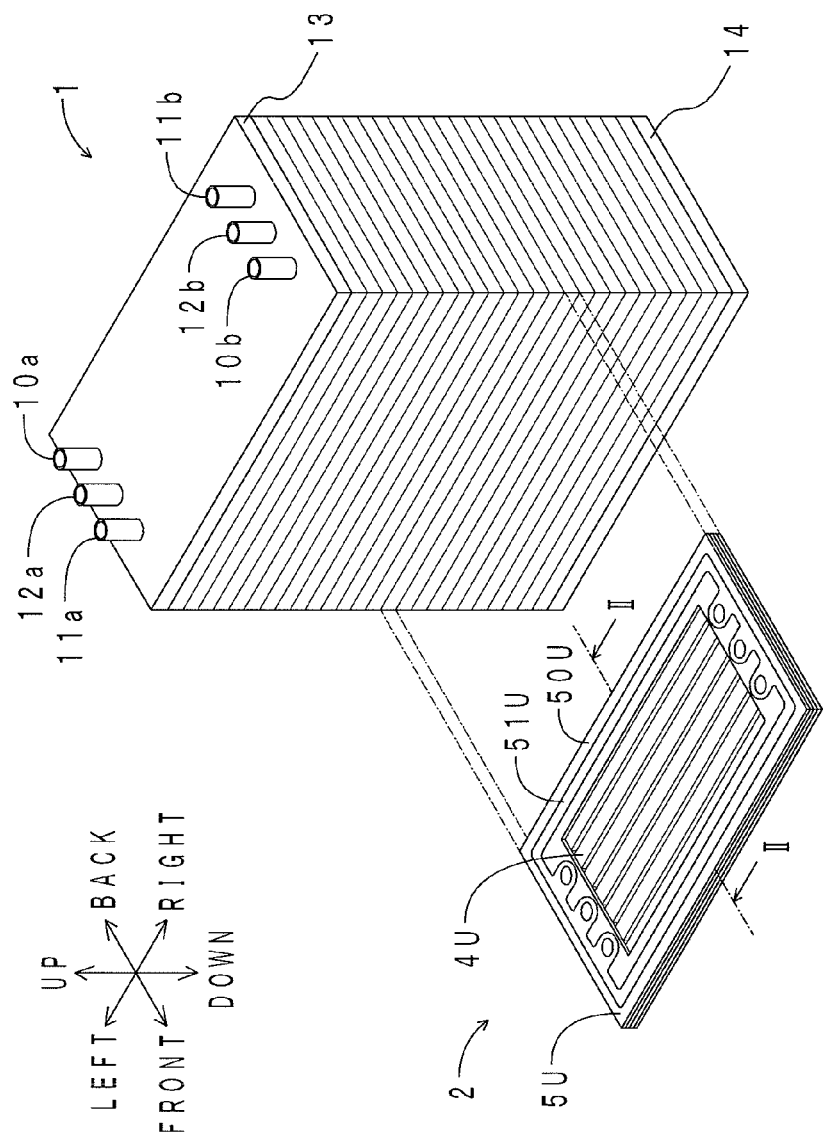
FIG. 1 is a perspective view of a fuel cell including a rubber gasket for a fuel cell according to an embodiment of the present invention.

FIG. 1 shows a perspective view of a fuel cell including the rubber gasket of the present embodiment. As shown in FIG. 1, a fuel cell 1 is configured by stacking a number of cell assemblies 2. The fuel cell 1 is a polymer electrolyte fuel cell. A pair of end plates 13, 14 is arranged at both ends of the stacked cell assemblies 2 in the up-down direction. Each of the pair of end plates 13, 14 is made of metal materials and has a rectangular plate shape.

An air supplying member 10a, which supplies air (oxidant gas), a cooling water supplying member 12a, which supplies cooling water, and a hydrogen supplying member 11a, which supplies hydrogen (fuel gas), are connected to a left edge of the fuel cell 1 in this order from the back side toward the front side. An air discharging member 10b, which discharges air, a cooling water discharging member 12b, which discharges cooling water, and a hydrogen discharging member 11b, which discharges hydrogen, are connected to a right edge of the fuel cell 1 in this order from the front side toward the back side. Each of the cell assemblies 2 is provided with a plurality of communication holes. The communication holes of the cell assemblies 2 are aligned in the stacking direction so that flow passages for air, hydrogen, and cooling water are formed so as to extend in the stacking direction of the cell assemblies 2.

<Configuration of Cell Assembly>

Figure 2:
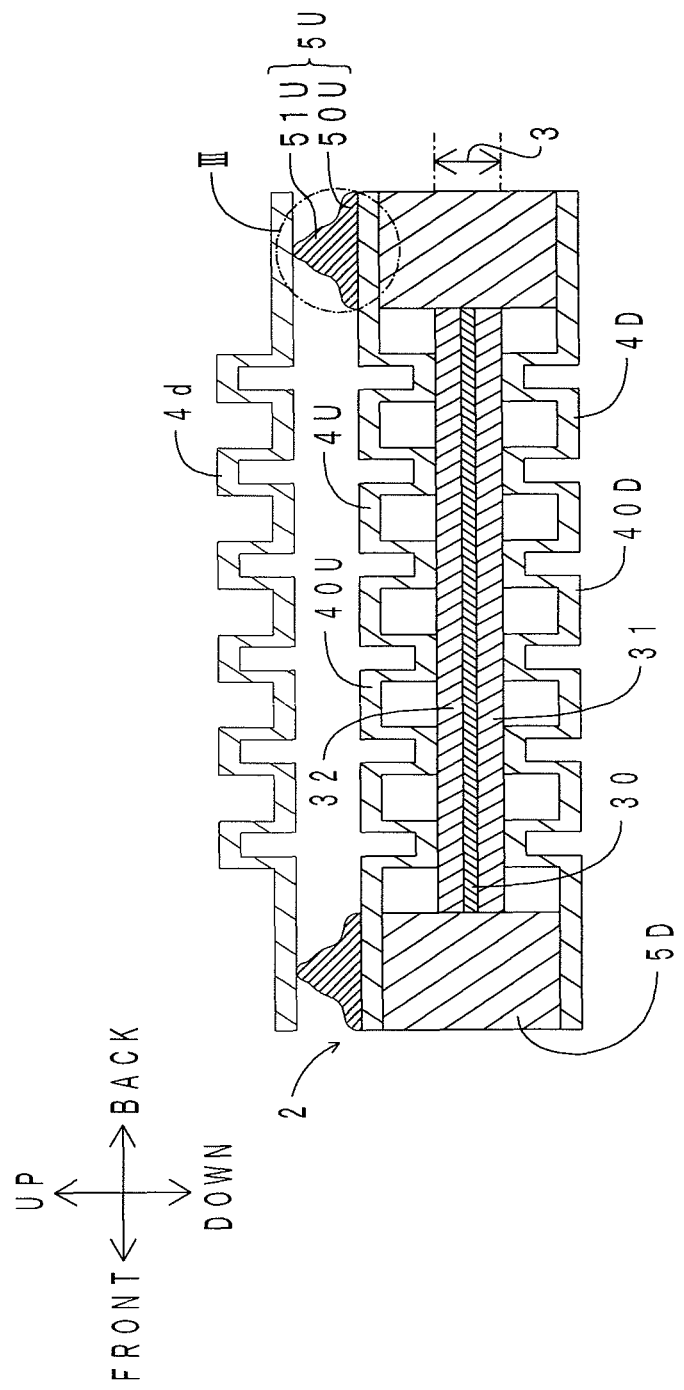
FIG. 2 is a cross-sectional view taken along line II-II of FIG. 1.

A configuration of the cell assembly 2 will now be described. FIG. 2 shows a cross-sectional view taken along line II-II of FIG. 1. As shown in FIG. 2, the cell assembly 2 includes an electrode member 3, a first separator 4U, a second separator 4D, a first rubber gasket 5U, and a second rubber gasket 5D.

[Electrode Member 3]

The electrode member 3 includes an MEA 30, an anode porous layer 31, and a cathode porous layer 32. The MEA 30 includes an electrolyte membrane, an anode catalyst layer, and a cathode catalyst layer. The electrolyte membrane is a perfluorinated sulfonic acid membrane, and has a rectangular thin-plate shape. The anode catalyst layer and the cathode catalyst layer each contain platinum-supporting carbon particles. The anode catalyst layer and the cathode catalyst layer each have a rectangular thin-plate shape. The anode catalyst layer is placed on the lower surface of the electrolyte membrane. The cathode catalyst layer is placed on the upper surface of the electrolyte membrane.

The anode porous layer 31 is a gas diffusion layer. The anode porous layer 31 is made of sintered foam metal, and has a rectangular thin plate shape. The anode porous layer 31 is placed on the lower surface of the MEA 30. The cathode porous layer 32 is a gas diffusion layer. The cathode porous layer 32 is made of sintered foam metal, and has a rectangular thin plate shape. The cathode porous layer 32 is placed on the upper surface of the MEA 30.

[First Separator 4U]

The first separator 4U is made of stainless steel, and has a rectangular thin plate shape. The first separator 4U is placed on the upper surface of the electrode member 3. The first separator 4U includes a ribbed portion 40U in a region overlapping the electrode member 3 when seen from above. The first separator 4U is included in a concept of "first member" of the present invention.

[Second Separator 4D]

The second separator 4D is made of stainless steel, and has a rectangular thin plate shape. The second separator 4D is placed on the lower surface of the electrode member 3. The second separator 4D includes a ribbed portion 40D in regions overlapping the electrode member 3 when seen from above.

As shown in FIG. 1, the fuel cell 1 is configured by stacking a number of cell assemblies 2. The first rubber gasket 5U is arranged while being compressed between the first separator 4U and a second separator 4d (shown with a thin line above the first rubber gasket 5U in FIG. 2) of a different cell assembly placed above the first separator 4U. The second separator 4d placed above the first separator 4U with the first rubber gasket 5U interposed therebetween is included in a concept of "second member" of the present invention.

[First Rubber Gasket 5U]

Figure 3:
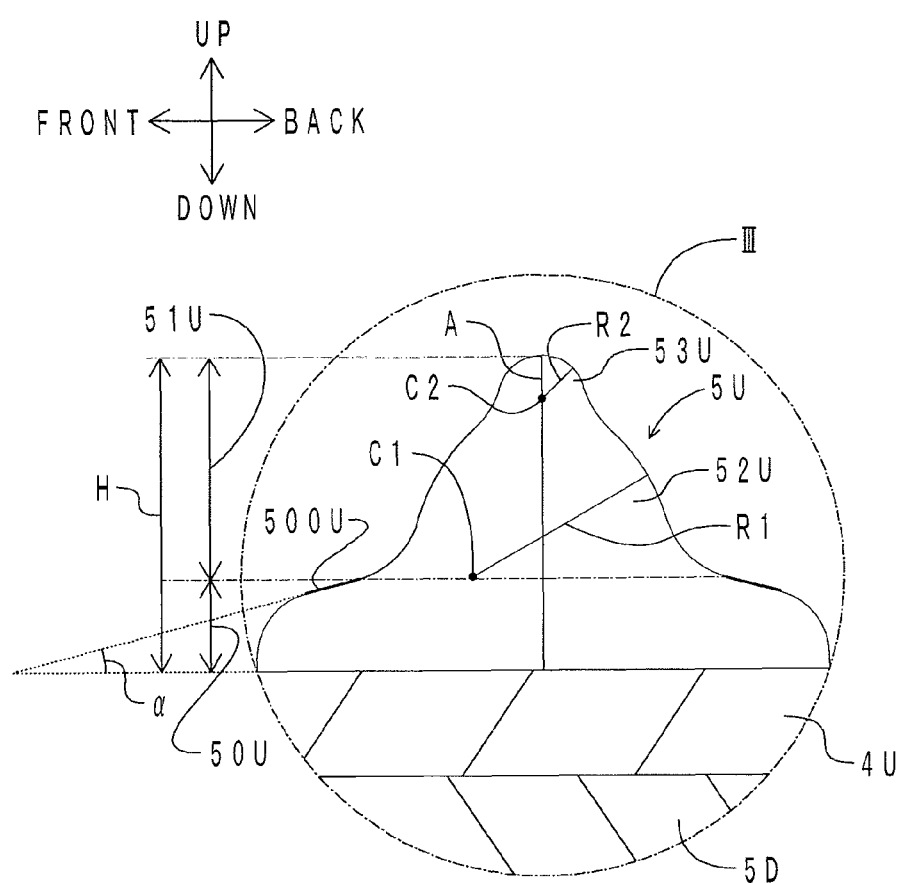
FIG. 3 is an enlarged view of a circle III of FIG. 2.

The first rubber gasket 5U is made of a crosslinked product of a solid rubber containing ethylene-propylene-diene rubber (EPDM) as a rubber component. The first rubber gasket 5U has a rectangular frame shape. The first rubber gasket 5U is adhered to a peripheral edge portion of the upper surface of the first separator 4U. FIG. 3 shows an enlarged view of a portion enclosed by a circle III in FIG. 2. In FIG. 3, the hatching of the first rubber gasket 5U is omitted for the sake of convenience of explanation. Furthermore, the second separator 4d is also omitted.

As shown in an enlarged manner in FIG. 3, the first rubber gasket 5U includes a seat portion 50U and a lip portion 51U. The seat portion 50U is arranged on the upper surface of the first separator 4U. The lip portion 51U is arranged in a projecting manner on the upper surface of the seat portion 50U. The lip portion 51U includes a first hill portion 52U and a second hill portion 53U. The first hill portion 52U projects upward from the seat portion 50U. The first hill portion 52U has a curved surface with a first curvature radius R1. The second hill portion 53U projects upward from the first hill portion 52U. A second curvature radius R2 of the second hill portion 53U is smaller than the first curvature radius R1 of the first hill portion 52U. The lip portion 51U is a two-stage rounded portion including the first hill portion 52U and the second hill portion 53U. The lip portion 51U is pressed against the second separator 4d (see FIG. 2) of a different cell assembly and compressed when the fuel cell 1 is in an assembled state. An annular seal line is formed when the lip portion 51U is brought into elastic contact with the second separator 4d.

The seat portion 50U has an inclined surface 500U (shown with a thick line in FIG. 3) at a connecting portion leading to a bottom of the first hill portion 52U. The inclined surface 500 U is a planar surface inclined with respect to the horizontal direction. The inclined surface 500U is inclined so that the length (height) of the first rubber gasket 5U in the up-down direction is smaller toward the front side and the back side. An angle α formed by the inclined surface 500U and the first separator 4U is 15°. The angle α formed by the inclined surface 500U and the first separator 4U is measured by extending the inclined surface 500U until it contacts the upper surface of the first separator 4U, as shown with a dotted line in FIG. 3.

Assuming a perpendicular line drawn from a center C2 of curvature of the second hill portion 53U to the first separator 4U is a central axis A of the second hill portion 53U, a center C1 of curvature of the first hill portion 52U does not lie on the central axis A. A ratio (R1/H) of the first curvature radius R1 of the first hill portion 52U with respect to the length (height) H of the first rubber gasket 5U in the up-down direction is 0.64.

[Second Rubber Gasket 5D]

Returning back to FIG. 2, the second rubber gasket 5D has a rectangular frame shape. The second rubber gasket 5D is made of a crosslinked product of a solid rubber containing EPDM as a rubber component. The second rubber gasket 5D is interposed between the first separator 4U and the second separator 4D. The electrode member 3 is accommodated within the frame of the second rubber gasket 5D. The second rubber gasket 5D is adhered to a peripheral edge portion of the upper surface of the second separator 4D, a peripheral edge portion of the lower surface of the first separator 4U, and an outer peripheral side surface of the electrode member 3. Thus, the second rubber gasket 5D externally seals the electrode member 3.

<Manufacturing Method of Cell Assembly>

Next, a manufacturing method of the cell assembly 2 will be described. The manufacturing method of the cell assembly 2 includes a first rubber gasket pre-forming step, a temporary assembled body producing step, and an integrating step.

[First Rubber Gasket Pre-Forming Step]

In the present step, a pre-formed body of the first rubber gasket 5U is arranged on the surface of the first separator 4U. First, an uncrosslinked product (rubber material) of a solid rubber containing EPDM as the rubber component is injection-molded while being heated at 80° C. to form the pre-formed body of the first rubber gasket 5U. The shape of the pre-formed body is the same as the shape of the first rubber gasket 5U. Next, the pre-formed body and the first separator 4U are placed in a mold and clamped. A primer is applied to the surface of the first separator 4U that is brought into contact with the pre-formed body. Thereafter, the mold is opened, and the first separator 4U, to the surface of which the pre-formed body of the first rubber gasket 5U is temporarily adhered, is obtained.

[Temporary Assembled Body Producing Step]

In the present step, a temporary assembled body including the pre-formed body of the second rubber gasket 5D, the electrode member 3, and the second separator 4D is produced. First, an uncrosslinked product (rubber material) of a solid rubber containing EPDM as the rubber component is injection-molded while being heated at 80° C. to form the pre-formed body of the second rubber gasket 5D. The shape of the pre-formed body is the same as the shape of the second rubber gasket 5D. Next, the pre-formed body, the electrode member 3, and the second separator 4D are placed in a mold and clamped. A primer is applied to the surface of the second separator 4D that is brought into contact with the pre-formed body. Thereafter, the mold is opened, and the temporary assembled body, in which the pre-formed body of the second rubber gasket 5D, the electrode member 3, and the second separator 4D are temporarily bonded together, is obtained.

[Integrating Step]

In the present step, the first separator 4U with the pre-formed body of the first rubber gasket 5U and the temporary assembled body are placed in the mold and heated to cross-link the pre-formed body. First, the temporary assembled body and the first separator 4U with the pre-formed body of the first rubber gasket 5U are arranged in the mold. A primer is applied to the surface of the first separator 4U that is brought into contact with the pre-formed body of the second rubber gasket 5D. The mold is then clamped, and the mold is heated for ten minutes at 150° C. The pre-formed body of the first rubber gasket 5U is thereby cross-linked to become the first rubber gasket 5U, and is adhered to the first separator 4U. The pre-formed body of the second rubber gasket 5D is cross-linked to become the second rubber gasket 5D, and is adhered to the first separator 4U, the electrode member 3, and the second separator 4D. The first rubber gasket 5U, the first separator 4U, the second rubber gasket 5D, the electrode member 3, and the second separator 4D are integrated in such a manner. Thus, the cell assembly 2 is manufactured.

<Operation and Effects>

The operation and effects of the rubber gasket (first rubber gasket 5U) of the present embodiment will now be described. The seat portion 50U of the first rubber gasket 5U has the inclined surface 500U at the connecting portion leading to the bottom of the first hill portion 52U. The first hill portion 52U and the seat portion 50U are coupled by the inclined surface 500U, so that the connecting portion between the first hill portion 52U and the seat portion 50U can be made thick. The lip portion 51U is thus less likely to collapse and the sealability is easily ensured even at the time of low compression. Furthermore, the breakage of the lip portion 51U at the time of high compression can be suppressed since the connecting portion between the first hill portion 52U and the seat portion 50U is reinforced.

According to the first rubber gasket 5U, assuming the perpendicular line drawn from the center C2 of curvature of the second hill portion 53U to the first separator 4U is the central axis A of the second hill portion 53U, the center C1 of curvature of the first hill portion 52U does not lie on the central axis A. The center C1 of curvature of the first hill portion 52U is shifted from the central axis A of the second hill portion 53U, so that the connecting portion between the first hill portion 52U and the second hill portion 53U can be made thick. The lip portion 51U is thus less likely to collapse and the sealability is easily ensured even at the time of low compression.

According to the first rubber gasket 5U, the angle α formed by the inclined surface 500U and the first separator 4U is 15°. Thus, the connecting portion between the first hill portion 52U and the seat portion 50U can be appropriately made thick, and both the sealability at the time of low compression and the suppression of breakage of the first rubber gasket 5U at the time of high compression can be achieved.

A ratio (R1/H) of the first curvature radius R1 of the first hill portion 52U with respect to the length (height) H of the first rubber gasket 5U in the up-down direction is 0.64. The value of R1/H is larger than or equal to 0.64 and smaller than or equal to 0.91, and thus both the sealability at the time of low compression and the suppression of breakage of the first rubber gasket 5U at the time of high compression can be achieved.

According to the first rubber gasket 5U, the sealability at the time of low compression can be ensured, and the range of usable compression rates can be expanded toward the low compression rate side. In other words, according to the first rubber gasket 5U, the space between the two separators (4U, 4d) stacked in the fuel cell 1 can be sealed in a wide range from a low compression rate to a high compression rate.

In the embodiment described above, the first rubber gasket 5U and the second rubber gasket 5D are made of the crosslinked product of the solid rubber containing EPDM as the rubber component. The solid rubber is a solid that can be mixed at a normal temperature. The uncrosslinked product (rubber material) of the solid rubber is thus injection-molded to easily form the pre-formed body of the first rubber gasket 5U and the second rubber gasket 5D. The pulling strength and the stretch of the crosslinked product of the solid rubber are larger than the pulling strength and the stretch of the crosslinked product of a liquid rubber. Thus, the first rubber gasket 5U and the second rubber gasket 5D easily follow the expansion and contraction of the electrolyte membrane due to moisture and like, and are excellent in durability.

<Others>

An embodiment of the rubber gasket for the fuel cell of the present invention has been described above. However, the embodiment is not limited to the above. The present invention can be implemented in various modified modes and improved modes that can be carried out by those skilled in the art.

In the embodiment described above, the up-down direction corresponds to the "stacking direction" in the present invention, and the horizontal direction (front-back, left-right directions) corresponds to the "surface direction" in the present invention. However, the correspondence of such directions is not particularly limited. In the embodiment described above, two members to be stacked are assumed as separators. However, the members are not limited to the separator and may be, for example, an end plate, and the like. The type of the two members may be the same or may be different.

The material, shape, and the like of each member included in the fuel cell are not limited to the embodiment described above. For example, the structure of the anode porous layer and the cathode porous layer included in the electrode member is not particularly limited. A single layer structure formed of only the gas diffusion layer may be adopted as in the embodiment described above, or a two-layer structure formed of the gas diffusion layer and the gas flow passage layer may be adopted. The shape of the separator may be a flat plate shape without the ribbed portion.

In the embodiment described above, the first rubber gasket and the second rubber gasket are both made of the crosslinked product of the solid rubber containing EPDM as the rubber component. However, the type of rubber of the first rubber gasket and the second rubber gasket is not particularly limited. The material of the first rubber gasket and the second rubber gasket may be different. In addition to the rubber component, the solid rubber may contain a cross-linker, a cross-linking auxiliary agent, an adhesive component, and the like. Other than EPDM, examples of the suitable rubber component include ethylene-propylene rubber (EPM), acrylonitrile-butadiene rubber (NBR), hydrogenated acrylonitrile-butadiene rubber (H-NBR), styrene-butadiene rubber (SBR), and butadiene rubber (BR). Examples of the suitable adhesive component include resorcinol based compound and melamine compound, silane coupling agent, and the like.

Various shapes including the shapes described in the examples below can be adopted for the shape of the rubber gasket for the fuel cell of the present invention. With regards to the dimension of the rubber gasket, for example, an angle formed by the inclined surface of the seat portion and the surface of the first member is desirably larger than or equal to 15° and smaller than or equal to 35°. The ratio (R1/H) of the first curvature radius R1 of the first hill portion with respect to the length H in the stacking direction is desirably larger than or equal to 0.64 and smaller than or equal to 0.91.

In the embodiment described above, the first rubber gasket is manufactured by injection molding. However, the rubber gasket for the fuel cell of the present invention may be manufactured using other molding methods such as press forming, and the like other than the injection molding. In the embodiment described above, the separator is placed on the pre-formed body of the first rubber gasket of after the injection molding. However, when carrying out the injection molding, the rubber material may be injected with the separator (member) placed in the mold in advance. In the member on which the rubber gasket is to be arranged, the application of the primer is not necessarily required, and the rubber gasket may be directly brought into contact with the member.

In the embodiment described above, the pre-formed body of the first rubber gasket is first temporarily adhered to the first separator, which is then united with the temporary assembled body, and the pre-formed body is crosslinked. However, the rubber gasket for the fuel cell of the present invention may be manufactured by cross-linking the rubber material without forming the pre-formed body in advance. In this case, the rubber gasket may be adhered to the member using an adhesive, and the like.

EXAMPLES

The present invention will be described in more detail using examples.

<Manufacturing of Samples>

In order to evaluate the performance of the rubber gasket, various rubber gaskets having different cross-sectional shapes were each formed on the surface of a separator to manufacture samples of a separator with a rubber gasket. First, (A) 100 parts by mass of rubber component, (E) 40 parts by mass of a softener, and (F) 40 parts by mass of a reinforcing agent were mixed and kneaded for five minutes at 120° C. using a Banbury mixer. After cooling the mixture, (B) 2 parts by mass of a cross-linker, (C) 1 part by mass of a cross-linking auxiliary agent, and (D) 3 parts by mass of an adhesive component were added and mixed for ten minutes at 5° C. using an open roll to obtain the rubber material. The obtained rubber material was arranged on the surface of the separator made of stainless steel so as to take a frame shape and held for 20 minutes at 130° C. in the mold to cross link the rubber material. Eight types of samples of the separator with a rubber gasket, with their respective cross-sectional shapes different from one another, were thus manufactured.

Figure 4:
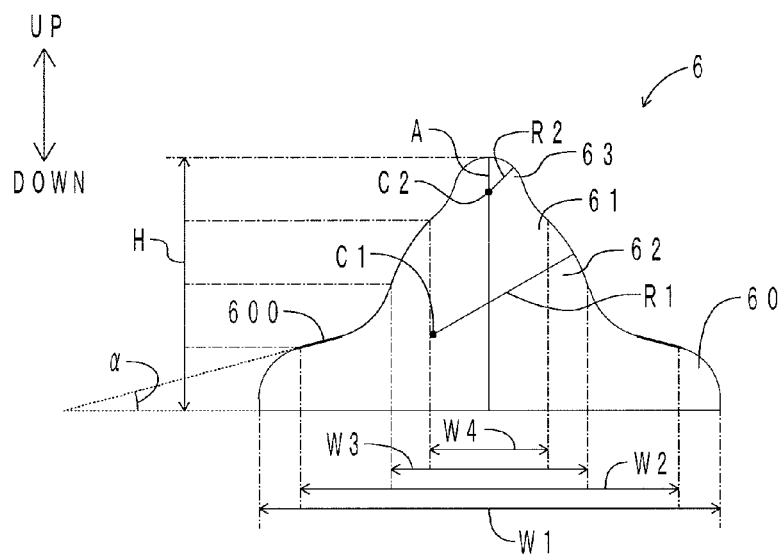
FIG. 4 is a cross-sectional view of a rubber gasket according to Example 1.
Figure 5:
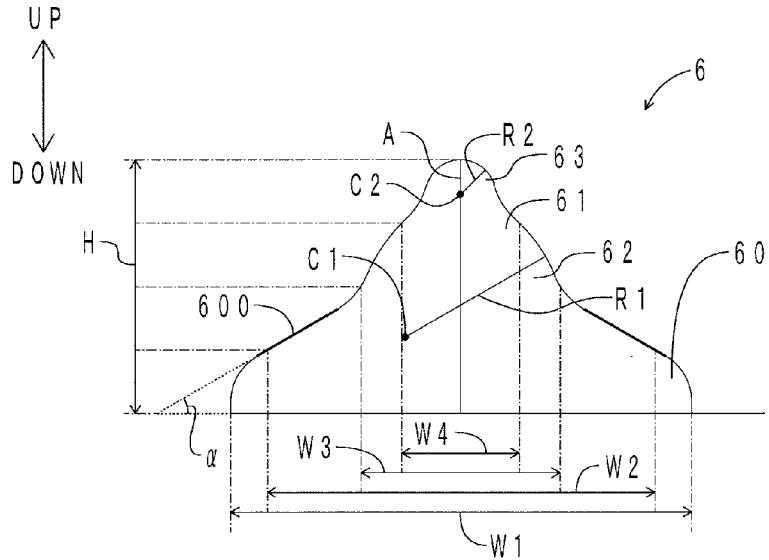
FIG. 5 is a cross-sectional view of a rubber gasket according to Example 2.
Figure 6:
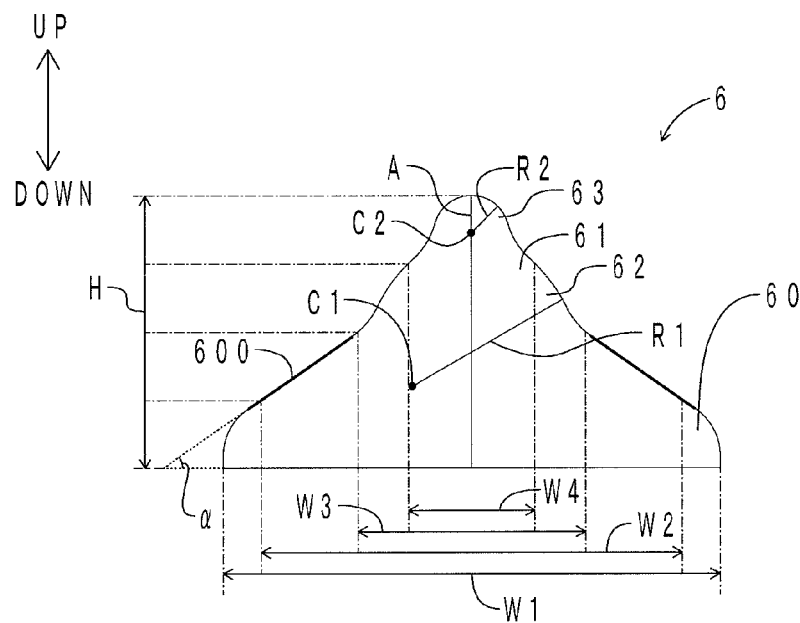
FIG. 6 is a cross-sectional view of a rubber gasket according to Example 3.
Figure 7:
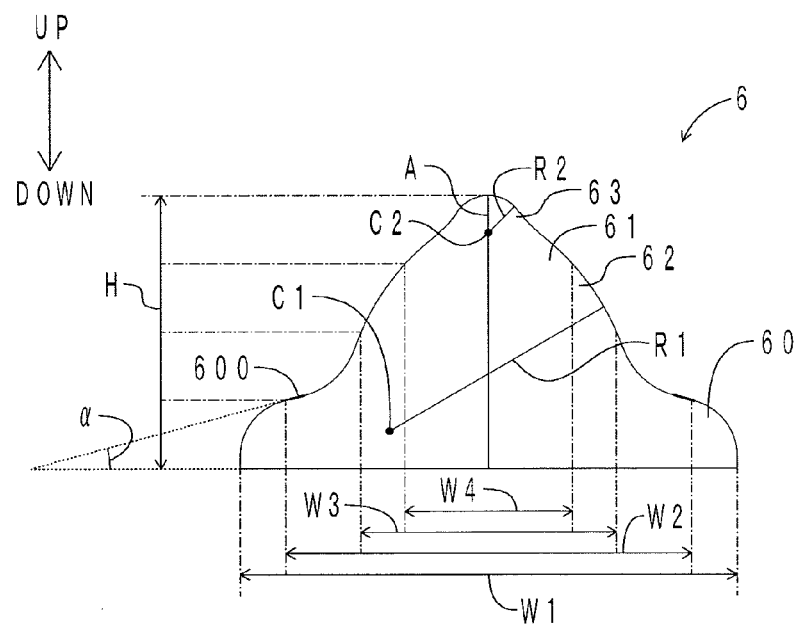
FIG. 7 is a cross-sectional view of a rubber gasket according to Example 4.
Figure 8:
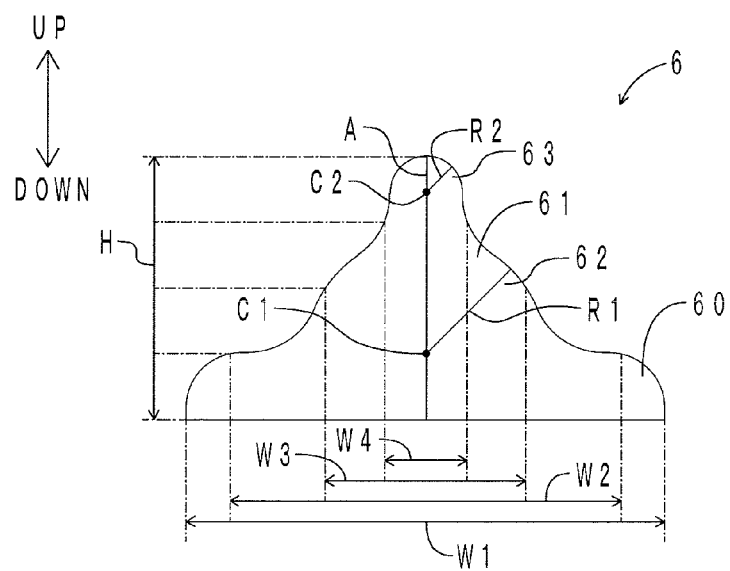
FIG. 8 is a cross-sectional view of a rubber gasket according to Comparative example 1.
Figure 9:
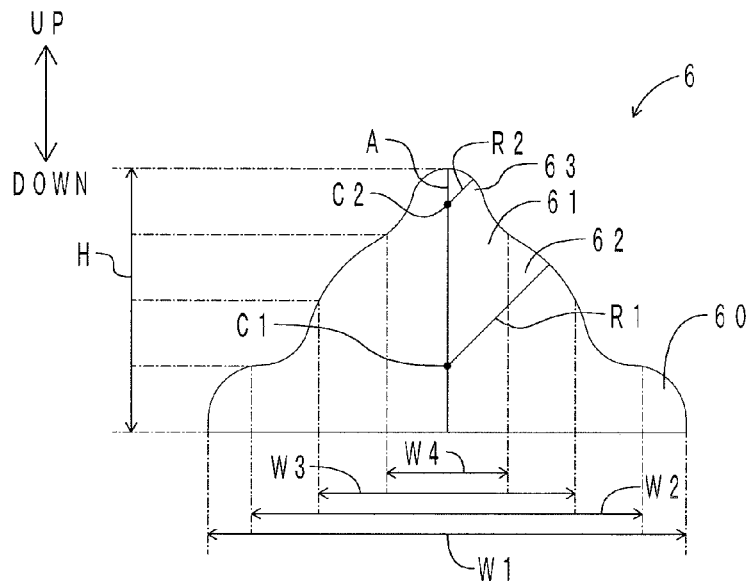
FIG. 9 is a cross-sectional view of a rubber gasket according to Comparative example 2.
Figure 10:
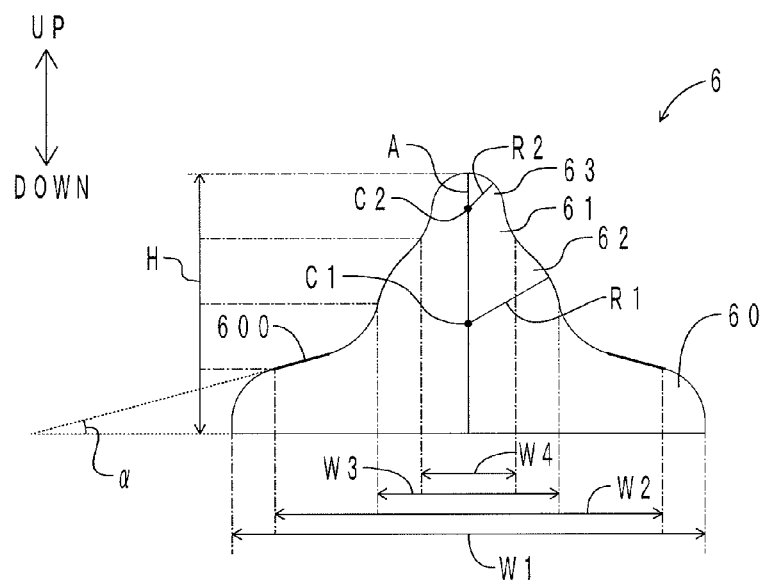
FIG. 10 is a cross-sectional view of a rubber gasket according to Comparative example 3.
Figure 11:
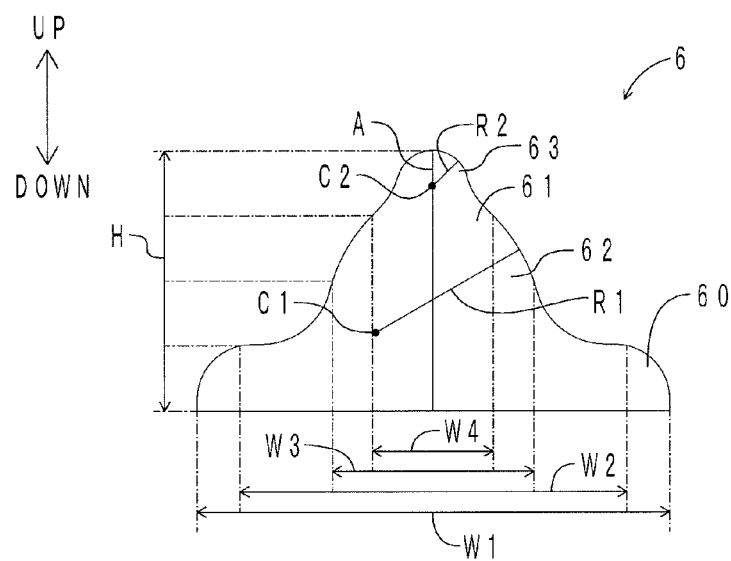
FIG. 11 is a cross-sectional view of a rubber gasket according to Comparative example 4.

The cross-sectional shape in the height direction (corresponds to stacking direction in the present invention) of the rubber gaskets of the manufactured samples are shown in FIG. 4 to FIG. 11. FIG. 4 is a cross-sectional view of a rubber gasket of Example 1. The cross-sectional shape of a rubber gasket of Example 1 is the same as the cross-sectional shape of the first rubber gasket 5U of the embodiment described above. FIG. 5 is a cross-sectional view of a rubber gasket of Example 2. FIG. 6 is a cross-sectional view of a rubber gasket of Example 3. FIG. 7 is a cross-sectional view of a rubber gasket of Example 4. FIG. 8 is a cross-sectional view of a rubber gasket of Comparative example 1. FIG. 9 is a cross-sectional view of a rubber gasket of Comparative example 2. FIG. 10 is a cross-sectional view of a rubber gasket of Comparative example 3. FIG. 11 is a cross-sectional view of a rubber gasket of Comparative example 4. In FIGS. 4 to 11, the hatching of the rubber gasket is omitted for the convenience of explanation. FIGS. 4 to 11 correspond to FIG. 3 described above.

As shown in FIGS. 4 to 11, a rubber gasket 6 includes a seat portion 60 and a lip portion 61. The lip portion 61 includes a first hill portion 62 and a second hill portion 63. The seat portion 60 of the rubber gasket 6 of Examples 1 to 4 and Comparative example 3 has an inclined surface 600 at a connecting portion leading to the bottom of the first hill portion 62 (see FIGS. 4 to 7, FIG. 10). In FIGS. 4 to 11, the dimensions (H, W1 to W4, R1, R2, α) of each region are shown in Table 1 to be described later. With respect to the rubber gaskets (Examples 1 to 4, Comparative example 3) in which the seat portion includes the inclined surface, the inclined surface is shown with a thick line. The rubber gaskets of Examples 1 to 4 are included in the rubber gasket for the fuel cell of the present invention.

The following were used for the raw materials (A) to (F) used in the manufacturing of the rubber gasket.

(A) rubber component: EPDM (manufactured by JSR Corporation "JSR EP27")

(B) cross-linker: peroxy ester (manufactured by NOF Corporation "Perbutyl (registered trademark) I" (t-butylperoxyisopropylmonocarbonate))

(C) cross-linking auxiliary agent: maleimide compound (manufactured by Ouchi Shinko Chemical Industrial Co., Ltd "Balnock (registered trademark) PM")

(D) adhesive component: silane coupling agent (manufactured by Shin-Etsu Chemical Co., Ltd. "KB403" (3-glycidoxypropyltrimethoxysilane))

(E) softener: paraffin based process oil (manufactured by Idemitsu Kosan Co. Ltd. "Diana (registered trademark) process oil PW380")

(F) reinforcing agent: carbon black (manufactured by Cabot Japan K.K. "Show Black (registered trademark IP200")

<Evaluation Method>

Figure 12:
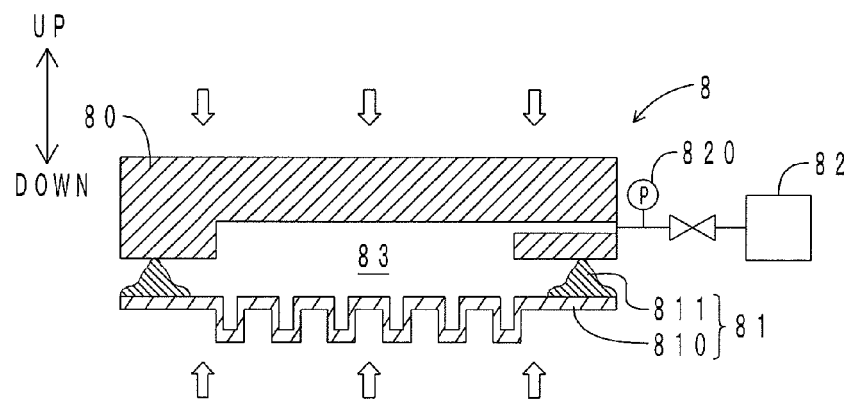
FIG. 12 is a sectional view of an experiment device used for evaluating the rubber gasket.
Figure 13:
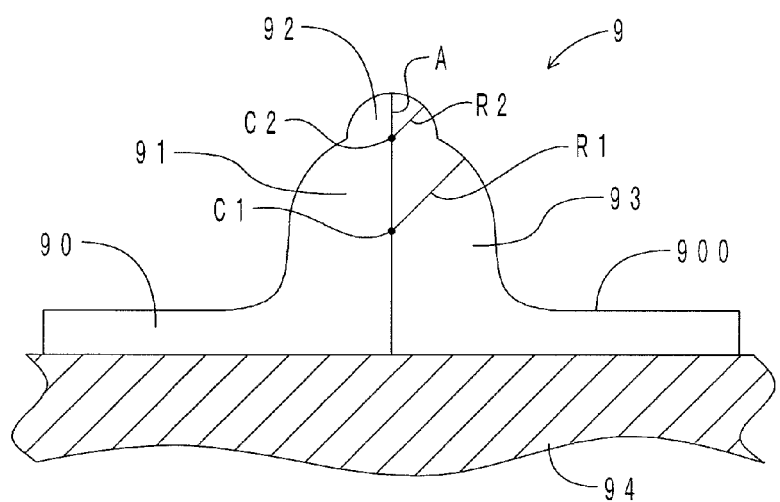
FIG. 13 is a cross-sectional view taken along a height direction of a conventional rubber gasket.

The rubber gaskets of the manufactured samples were compressed at a predetermined compression rate, and the sealability and the durability of the rubber gaskets were evaluated. First, the experiment device and the experiment method will be described. FIG. 12 shows a sectional view of the experiment device. As shown in FIG. 12, an experiment device 8 includes a jig 80 and a sample 81. The jig 80 is made of stainless steel, and has a rectangular plate shape. The jig 80 is arranged on the rubber gasket 811 side of the sample 81. A nitrogen gas supplying device 82 is connected to the jig 80. A pressure gauge 820 is arranged on a piping that connects the jig 80 and the nitrogen gas supplying device 82. First, as shown with outlined white arrow in FIG. 12, a load is applied from both upper and lower sides of the experiment device 8 to compress a rubber gasket 811 until a predetermined compression rate is reached. Thus, a space 83 sealed by the rubber gasket 811 is formed between the jig 80 and a separator 810. In the present experiment, the compression rate is calculated with the following equation (1).

Compression rate (%)=(1−H'/H)×100 (1)

[H: height of rubber gasket before compression, H': height of rubber gasket after compression (=distance between jig and separator)]

(1) Sealability at Time of Low Compression

The experiment device 8 was placed in an atmosphere of a temperature of 100° C. with the compression rate of the rubber gasket 811 at 10% or 15%. The nitrogen gas was then supplied from the nitrogen gas supplying device 82 so that the pressure in the space 83 became 1 MPa. Half an hour later, the pressure in the space 83 was measured. The sealability was evaluated as satisfactory (indicated with ○ in Table 1 to be described later) if the pressure did not reduce, and the sealability was evaluated as unsatisfactory (indicated with × in Table 1 to be described later) if the pressure reduced.

(2) Durability at Time of High Compression

The experiment device 8 was placed in an atmosphere of a temperature of 100° C. with the compression rate of the rubber gasket 811 at 55%, 60%, or 65%. Half an hour later, the load was removed to release the compression of the rubber gasket 811. The cross-section in the height direction of the rubber gasket 811 was then visually observed, where the durability was evaluated as satisfactory (indicated with ○ in Table 1 to be described later) if the breakage did not occur, and the durability was evaluated as unsatisfactory (indicated with × in Table 1 to be described later) if the breakage occurred.

<Evaluation Result>

The dimensions of the rubber gasket shown in FIGS. 4 to 11 and the evaluation results of the rubber gasket are summarized in Table 1.

TABLE 1

| | | Example 1 | Example 2 | Example 3 | Example 4 | Comparative example 1 | Comparative example 2 | Comparative example 3 | Comparative example 4 |
|---|---|---|---|---|---|---|---|---|---|
| Dimension of rubber gasket | Height H [mm] | 1.10 | 1.10 | 1.10 | 1.10 | 1.10 | 1.10 | 1.10 | 1.10 |
| | Width W1 [mm] | 2.00 | 2.00 | 2.00 | 2.00 | 2.00 | 2.00 | 2.00 | 2.00 |
| | Second curvature radius R2 of second hill portion [mm] | 0.15 | 0.15 | 0.15 | 0.15 | 0.15 | 0.15 | 0.15 | 0.15 |
| | First curvature radius R1 of first hill portion [mm] | 0.70 | 0.70 | 0.70 | 1.00 | 0.50 | 0.60 | 0.40 | 0.70 |
| | Width W2 at height of ¼ H [mm] | 1.64 | 1.68 | 1.68 | 1.64 | 1.64 | 1.64 | 1.64 | 1.64 |
| | Width W3 at height of ½ H [mm] | 0.86 | 0.86 | 0.92 | 1.03 | 0.84 | 1.07 | 0.75 | 0.85 |
| | Width W4 at height of ¾ H [mm] | 0.51 | 0.51 | 0.51 | 0.66 | 0.34 | 0.50 | 0.40 | 0.51 |
| | R1/H | 0.64 | 0.64 | 0.64 | 0.91 | 0.45 | 0.55 | 0.36 | 0.64 |
| | Presence/absence and angle α [°] of inclined surface | Present 15.0 | Present 30.0 | Present 35.0 | Present 15.0 | Absent — | Absent — | Present 15.0 | Absent — |
| | Shift of center C1 of curvature of first hill portion | Present | Present | Present | Present | Absent | Absent | Absent | Present |
| Evaluation | Durability in high compression Compression rate 65% | ○ | ○ | × | × | ○ | × | ○ | ○ |
| | Compression rate 60% | ○ | ○ | ○ | ○ | ○ | × | ○ | ○ |
| | Compression rate 55% | ○ | ○ | ○ | ○ | ○ | ○ | ○ | ○ |
| | Scalability in low compression Compression rate 15% | ○ | ○ | ○ | ○ | × | ○ | ○ | ○ |
| | Compression rate 10% | ○ | ○ | ○ | ○ | × | ○ | × | × |
| | Range of usable compression rates | 55% | 55% | 50% | 50% | — | 45% | 50% | 50% |

As shown in Table 1 and FIGS. 4 to 7, in the rubber gaskets of Examples 1 to 4, the seat portion includes an inclined surface and the center C1 of curvature of the first hill portion does not lie on the central axis A of the second hill portion. Thus, according to the rubber gaskets of Examples 1 to 4, the sealability was ensured even at the time of low compression when the compression rate was 15% or 10%. Furthermore, the range of usable compression rates was higher than or equal to 50%. The range of usable compression rates was calculated with the following equation (2).

Range of usable compression rate (%)=(maximum compression rate at which breakage of rubber gasket did not occur of compression rates 55%, 60%, 65%)−(minimum compression rate at which sealability was ensured of compression rates 10%, 15%) (2)

In the rubber gasket of Example 3, the breakage occurred when the compression rate was 65%. In the rubber gasket of Example 3, the angle of the inclined surface is large compared to the rubber gaskets of the other examples. Thus, it is assumed that the connecting portion between the first hill portion and the seat portion became too thick, and the strain concentrated at the lower side portion of the seat portion at the time of high compression.

In the rubber gasket of Example 4, the angle of the inclined surface is the same as the angle of the inclined surface in the rubber gasket of Example 1, but the breakage occurred when the compression rate was 65%. In the rubber gasket of Example 4, the first curvature radius R1 of the first hill portion is large compared to the rubber gasket of Example 1. In other words, the value of R1/H is large. Thus, it is assumed that the strain concentrated at the interior of the first hill portion at the time of high compression.

As shown in Table 1 and FIG. 8, the seat portion of the rubber gasket of Comparative example 1 does not have an inclined surface. The seat portion is coupled to the bottom of the first hill portion by a horizontal surface. Furthermore, the center C1 of curvature of the first hill portion and the center C2 of curvature of the second hill portion are on the same central axis A. The sealability at the time of low compression thus was not ensured. As shown in Table 1 and FIG. 9, in the rubber gasket of Comparative example 2, the first curvature radius R1 of the first hill portion is larger than that in the rubber gasket of Comparative example 1. The sealability at the time of low compression thus enhanced, but the breakage of the rubber gasket occurred at the time of high compression. This is assumed to be because the strain concentrated at the interior of the first hill portion. Therefore, in the rubber gasket of Comparative example 2, the range of usable compression rates was 45%.

As shown in Table 1 and FIG. 10, in the rubber gasket of Comparative example 3, the seat portion has the inclined surface, and the center C1 of curvature of the first hill portion and the center C2 of curvature of the second hill portion are on the same central axis A. Therefore, the value of R1/H is small and the sealability was not ensured when the compression rate was 10%. As shown in Table 1 and FIG. 11, in the rubber gasket of Comparative example 4, the center C1 of curvature of the first hill portion was shifted but the seat portion does not have an inclined surface. The seat portion is coupled to the bottom of the first hill portion by the horizontal surface. Therefore, the connecting portion between the first hill portion and the seat portion cannot be made sufficiently thick, and the sealability cannot be ensured when the compression rate was 10%.

What is claimed is:

1. A rubber gasket for a fuel cell, the rubber gasket having a frame shape and interposed between two members stacked in the fuel cell, a direction in which the two members are stacked being a stacking direction, a direction orthogonal to the stacking direction being a surface direction, one of the two members being a first member, and the other member being a second member, the rubber gasket for a fuel cell comprising:
   a seat portion arranged on a surface of the first member; and
   a lip portion that includes: a first hill portion projecting from the seat portion toward the second member in the stacking direction and having a curved surface with a first curvature radius; and a second hill portion projecting from the first hill portion toward the second member in the stacking direction and having a curved surface with a second curvature radius smaller than the first curvature radius, and that makes elastic contact with the second member, wherein
   the seat portion has a planar inclined surface inclined with respect to the surface direction at a connecting portion leading to a bottom of the first hill portion, and
   a center of curvature of the first hill portion does not lie on a central axis of the second hill portion, the central axis being a perpendicular line drawn from a center of curvature of the second hill portion to the first member, wherein both the curved surface of the first hill portion and the curved surface of the second hill portion are convex with respect to the central axis of the second hill portion.

2. The rubber gasket for a fuel cell according to claim 1, wherein an angle formed by the inclined surface of the seat portion and the surface of the first member is larger than or equal to 15° and smaller than or equal to 35°.

3. The rubber gasket for a fuel cell according to claim 1, wherein a ratio of the first curvature radius of the first hill portion with respect to a length of the rubber gasket in the stacking direction is larger than or equal to 0.64 and smaller than or equal to 0.91.

4. The rubber gasket for a fuel cell according to claim 1, wherein the two members are separators.

5. The rubber gasket for a fuel cell according to claim 2, wherein a ratio of the first curvature radius of the first hill portion with respect to a length of the rubber gasket in the stacking direction is larger than or equal to 0.64 and smaller than or equal to 0.91.

6. The rubber gasket for a fuel cell according to claim 2, wherein the two members are separators.

7. The rubber gasket for a fuel cell according to claim 3, wherein the two members are separators.

8. The rubber gasket for a fuel cell according to claim 5, wherein the two members are separators.

9. The rubber gasket for a fuel cell according to claim 1, wherein a width of the rubber gasket at half a height of the rubber gasket in the stacking direction from the surface of the first member is larger than or equal to 0.86 mm and smaller than or equal to 1.03 mm.

10. The rubber gasket for a fuel cell according to claim 2, wherein a width of the rubber gasket at half a height of the rubber gasket in the stacking direction from the surface of the first member is larger than or equal to 0.86 mm and smaller than or equal to 1.03 mm.

11. The rubber gasket for a fuel cell according to claim 3, wherein a width of the rubber gasket at half a height of the rubber gasket in the stacking direction from the surface of the first member is larger than or equal to 0.86 mm and smaller than or equal to 1.03 mm.

12. The rubber gasket for a fuel cell according to claim 5, wherein a width of the rubber gasket at half a height of the rubber gasket in the stacking direction from the surface of the first member is larger than or equal to 0.86 mm and smaller than or equal to 1.03 mm.

13. The rubber gasket for a fuel cell according to claim 1, wherein
   inner and outer edge parts of the seat portion, which connect to the inclined surface, have a curved surface.

* * * * *